United States Patent
Cho et al.

(10) Patent No.: US 11,124,039 B2
(45) Date of Patent: Sep. 21, 2021

(54) COUPLED TORSION BEAM AXLE APPARATUS OF VEHICLE

(71) Applicants: HYUNDAI MOTOR COMPANY, Seoul (KR); KIA MOTORS CORPORATION, Seoul (KR)

(72) Inventors: Youn Hyung Cho, Seoul (KR); Dong Min Lim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 77 days.

(21) Appl. No.: 16/569,438

(22) Filed: Sep. 12, 2019

(65) Prior Publication Data

US 2020/0353787 A1 Nov. 12, 2020

(30) Foreign Application Priority Data

May 7, 2019 (KR) .................. 10-2019-0052787

(51) Int. Cl.
*B60G 21/05* (2006.01)

(52) U.S. Cl.
CPC ........ *B60G 21/051* (2013.01); *B60G 2200/21* (2013.01); *B60G 2206/20* (2013.01)

(58) Field of Classification Search
CPC .............. B60G 21/051; B60G 2200/23; B60G 2206/20; B60G 2200/21; B60G 2200/20
USPC .................... 280/124.128, 124.149, 124.152
See application file for complete search history.

(56) References Cited

U.S. PATENT DOCUMENTS

| | | | | |
|---|---|---|---|---|
| 4,234,205 A | * | 11/1980 | Thiesce | B60G 11/183 280/124.107 |
| 6,447,073 B1 | * | 9/2002 | Goettker | B60B 35/04 267/276 |
| 7,798,508 B2 | * | 9/2010 | Wettlaufer, Jr. | B60G 21/0555 280/124.152 |
| 8,684,381 B2 | * | 4/2014 | Buhl | B60G 21/0555 280/124.107 |
| 9,764,613 B2 | * | 9/2017 | Rowe | B60G 7/001 |
| 2006/0017252 A1 | * | 1/2006 | Oki | B60G 11/183 280/124.106 |
| 2007/0069496 A1 | | 3/2007 | Rinehart et al. | |
| 2011/0089658 A1 | * | 4/2011 | Buhl | B60G 21/0555 280/124.106 |
| 2012/0217716 A1 | * | 8/2012 | Ehrlich | B60G 21/051 280/124.128 |

FOREIGN PATENT DOCUMENTS

CN   201881843 U   6/2011
KR   20-1998-0029852 U   8/1998
(Continued)

*Primary Examiner* — Toan C To
(74) *Attorney, Agent, or Firm* — Morgan, Lewis & Bockius LLP

(57) ABSTRACT

A coupled torsion beam axle apparatus of a vehicle includes: a left torsion bar and a right torsion bar arranged in an internal space of the torsion beam so to be separated from each other in a horizontal direction of a torsion beam. Torsion stiffness of the torsion beam is tuned by replacing the left torsion bar and the right torsion bar, and particularly, warping stiffness is tuned by changing a position where the left torsion bar is coupled to the torsion beam and a position where the right torsion bar is coupled to the torsion beam.

11 Claims, 9 Drawing Sheets

(56) References Cited

FOREIGN PATENT DOCUMENTS

| KR | 10-2005-0100176 A | 10/2005 |
|----|-------------------|---------|
| KR | 10-0580515 B1 | 5/2006 |
| KR | 10-2006-0072282 A | 6/2006 |
| KR | 10-2008-0009803 A | 1/2008 |
| KR | 10-1338966 B1 | 12/2013 |

* cited by examiner

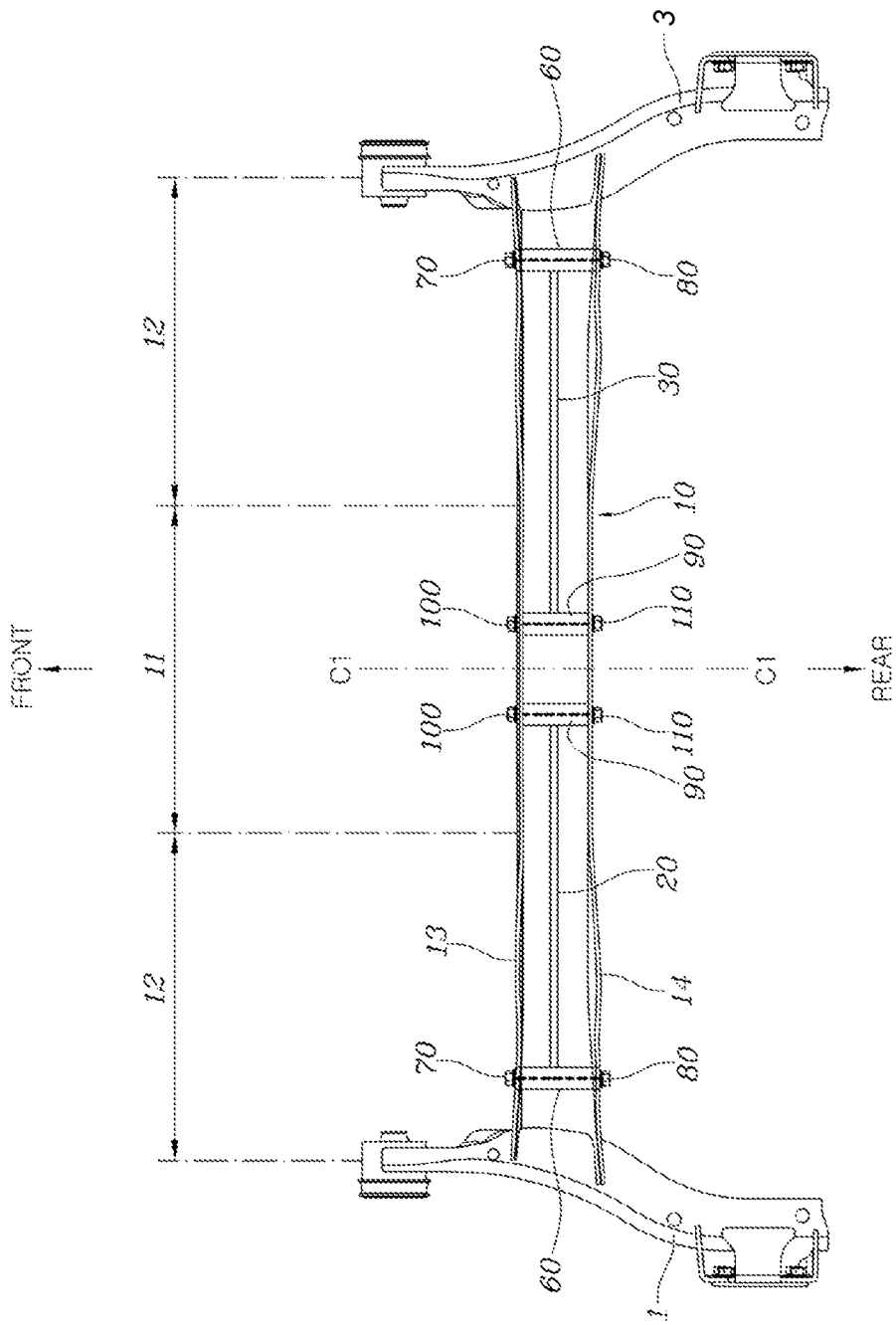

COUPLED TORSION BEAM AXLE APPARATUS OF VEHICLE

CROSS REFERENCE TO RELATED APPLICATION

The present application claims priority to Korean Patent Application No. 10-2019-0052787, filed May 7, 2019 in the Korean Intellectual Property Office, the entire contents of which is incorporated herein for all purposes by this reference.

TECHNICAL FIELD

The present disclosure relates to a coupled torsion beam axle apparatus of a vehicle, and more particularly, to a technology of a coupled torsion beam axle apparatus of a vehicle capable of adjusting torsion stiffness and warping stiffness.

BACKGROUND

In general, a suspension of a vehicle is a device for preventing a vehicle body or freight from being damaged and improving a ride comfort by connecting an axle and the vehicle body to each other so as not to directly deliver a vibration or an impact from a road surface to the vehicle body when the vehicle is traveling. The vehicle suspension is mainly classified into a front suspension and a rear suspension.

A vehicle includes a coupled torsion beam axle apparatus as a rear suspension which includes a torsion beam formed in an open-loop shape having a U-shape or a V-shape cross-section and having left and right sides each coupled to trailing aims, and a torsion bar positioned in an inner space of the torsion beam, arranged horizontally along a length direction of the torsion beam, and having left and right sides each coupled to the trailing arms.

The coupled torsion beam axle apparatus as described above has a small number of components, a low unit cost, and particularly, high space utilization, and thus is mainly used for small and medium vehicles.

However, in the conventional coupled torsion beam axle apparatus, since the torsion bar assisting stiffness is integrally coupled to the trailing arms by welding, the torsion bar may not be replaced and a position of the torsion bar may not be changed either. As a result, it is not possible to tune torsion stiffness and warping stiffness.

That is, a racing vehicle or a high-performance vehicle should be able to adjust the torsion stiffness and the warping stiffness in consideration of driving characteristics if necessary, but in the conventional coupled torsion beam axle apparatus as described above, the replacement of the torsion bar and the position change thereof may not be performed, and thus, it is not possible to use the coupled torsion beam axle apparatus of a vehicle in the racing vehicles or the high-performance vehicle required to adjust roll stiffness.

The contents described as the related art have been provided only to assist in understanding the background of the present disclosure and should not be considered as corresponding to the related art known to those having ordinary skill in the art.

SUMMARY

An object of the present disclosure is to provide a coupled torsion beam axle apparatus of a vehicle capable of adjusting torsion stiffness through a replaceable structure of a torsion bar, and particularly, adjusting warping stiffness through a position changeable structure of a torsion bar, thereby tuning the roll stiffness according to driving characteristics of a driver and thus being used in a general vehicle, a racing vehicle, or a high-performance vehicle.

According to an exemplary embodiment of the present disclosure, a coupled torsion beam axle apparatus of a vehicle includes: a torsion beam arranged in a horizontal direction of the vehicle and coupled to a left trailing arm and a right trailing arm; and a left torsion bar and a right torsion bar arranged in an internal space of the torsion beam and separated from each other in a horizontal direction of the torsion beam, wherein a left side of the left torsion bar is connected to any one of the left trailing arm and the torsion beam, a right side of the right torsion bar is connected to any one of the right trailing arm and the torsion beam, and a right side of the left torsion bar and a left side of the right torsion bar are connected to the torsion beam.

A first bracket and a second bracket may be fixedly coupled to the left trailing arm and the right trailing arm, respectively, the left side of the left torsion bar may be coupled to the first bracket to be connected to the left trailing arm, the right side of the right torsion bar may be coupled to the second bracket to be connected to the left trailing arm, and when a length of the torsion beam 10 in the horizontal direction is trisected, the right side of the left torsion bar and the left side of the right torsion bar may be coupled to an intermediate region.

The first bracket and the second bracket may be each provided with two fixing portions arranged to face each other while being spaced apart in a front-rear direction, a first pipe may be inserted between the two fixing portions, the first pipe being coupled to each of the left side of the left torsion bar and the right side of the right torsion bar, a first bolt may penetrate through the two fixing portions and the first pipe to be fastened to a first nut, and the left side of the left torsion bar and the right side of the right torsion bar may be each rotated around the first bolt in an vertical direction, in a state before the first bolt and the first nut are fastened.

When a length of the torsion beam 10 in the horizontal direction is trisected, the right side of the left torsion bar and the left side of the right torsion bar may be coupled to an intermediate region, and the left side of the left torsion bar and the right side of the right torsion bar may be coupled to side regions positioned on left and right sides of the intermediate region.

A second pipe may be each coupled to the right side of the left torsion bar and the left side of the right torsion bar to be arranged in a front-rear direction, the second pipe may be arranged between front and rear surfaces of the torsion beam, and a second bolt may penetrate through the front and rear surfaces of the torsion beam and the second pipe to be fastened to a second nut.

A hole through which the second bolt penetrates may be formed on the torsion beam to penetrate through the front and rear surfaces, and a plurality of holes may be spaced apart in an vertical direction of the torsion beam.

When a length of the torsion beam 10 in the horizontal direction is trisected, the right side of the left torsion bar and the left side of the right torsion bar may be coupled to an intermediate region through the second bolt.

The left torsion bar and the right torsion bar may be separable from each other, and torsion stiffness of the torsion beam may be adjusted by replacing the left torsion bar and the right torsion bar.

The left torsion bar and the right torsion bar may be coupled to be symmetrical with respect to a center line bisecting a length of the torsion beam in the horizontal direction.

The plurality of holes may be spaced apart from each other along a locus of a circle with the left side of the left torsion bar and the right side of the right torsion bar as a center.

A lowermost hole among the plurality of holes vertically spaced apart along the locus of the circle may be formed at a position closest to the center line bisecting a length of the torsion beam in the horizontal direction, and the left side of the left torsion bar and the right side of the right torsion bar may each have a same height as that of the lowermost hole.

As the second bolt is fastened toward an upper hole, warpage of the torsion beam may be relieved to lower the roll stiffness, and as the second bolt is fastened toward a lower hole, the warpage of the torsion beam may be maximized to increase the roll stiffness.

BRIEF DESCRIPTION OF THE DRAWINGS

FIGS. 7 and 8 are views showing a state at which a left side of a left torsion bar and a right side of a right torsion bar are each coupled to left and right side regions of the torsion beam according to another exemplary embodiment of the present disclosure.

DETAILED DESCRIPTION OF THE EMBODIMENTS

Figure 1:
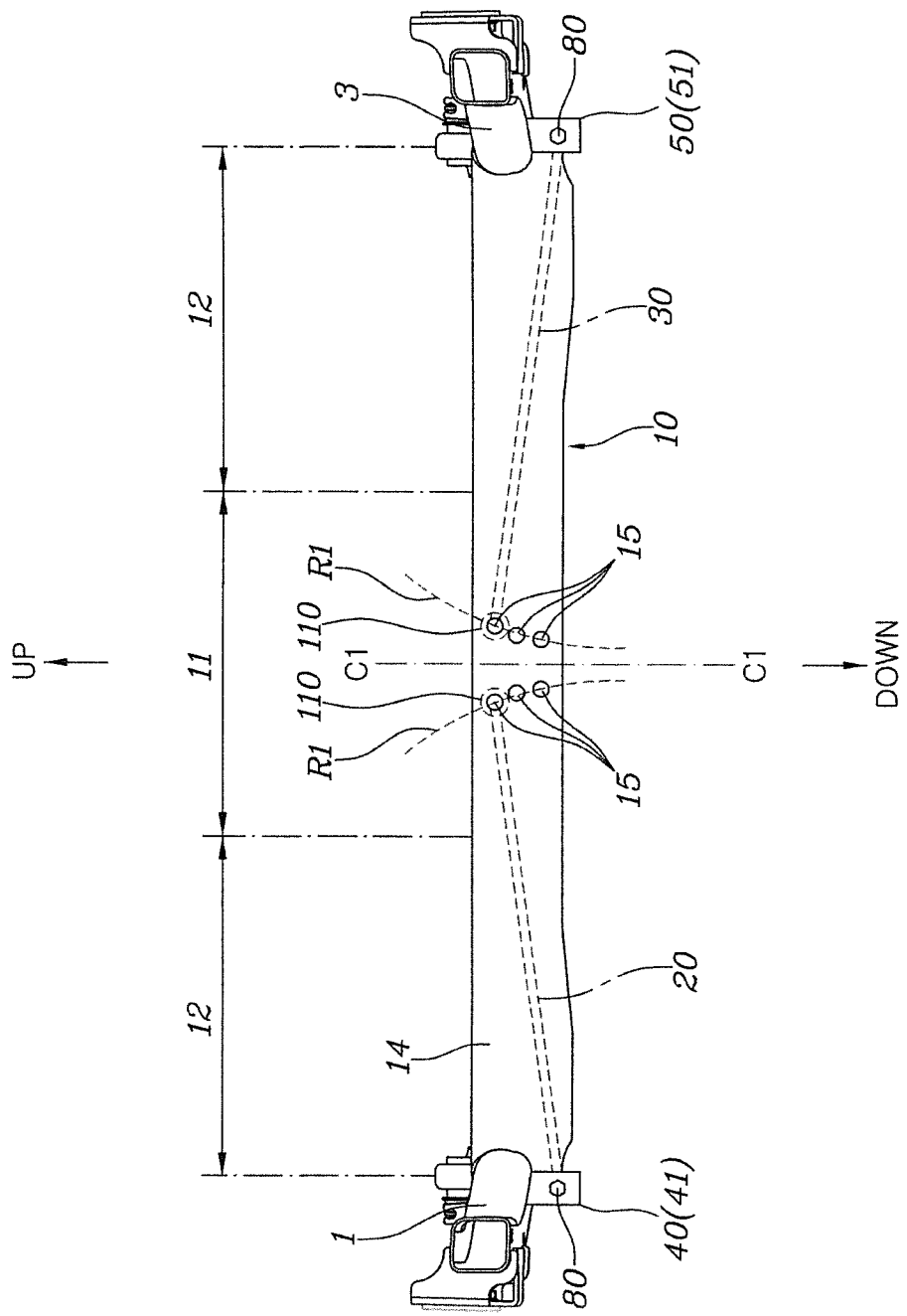
FIGS. 1 and 2 are, respectively, a rear view and a bottom view of a coupled torsion beam axle apparatus of a vehicle according to an exemplary embodiment of the present disclosure.

Hereinafter, a coupled torsion beam axle apparatus of a vehicle according to an exemplary embodiment of the present disclosure is described with reference to the accompanying drawings.

As shown in FIGS. 1 to 6, a coupled torsion beam axle apparatus of a vehicle according to an exemplary embodiment of the present disclosure includes: a torsion beam 10 formed in an open-loop shape having a U-shape or a V-shape cross-section and opened downward, arranged in a horizontal direction, and each coupled to a left trailing arm 1 and a right trailing arm 3; and a left torsion bar 20 and a right torsion bar 30 arranged in an inner space of the torsion beam 10 so as to be separated from each other in a horizontal direction of the torsion beam 10.

A left side (left end portion) of the left torsion bar 20 is coupled to any one of the left trailing arm 1 and the torsion beam 10, a right side (right end portion) of the right torsion bar 30 is coupled to any one of the right trailing arm 3 and the torsion beam 10, and a right side (right end portion) of the left torsion bar 20 and a left side (left end portion) of the right torsion bar 30 are coupled to the torsion beam 10.

Figure 2:
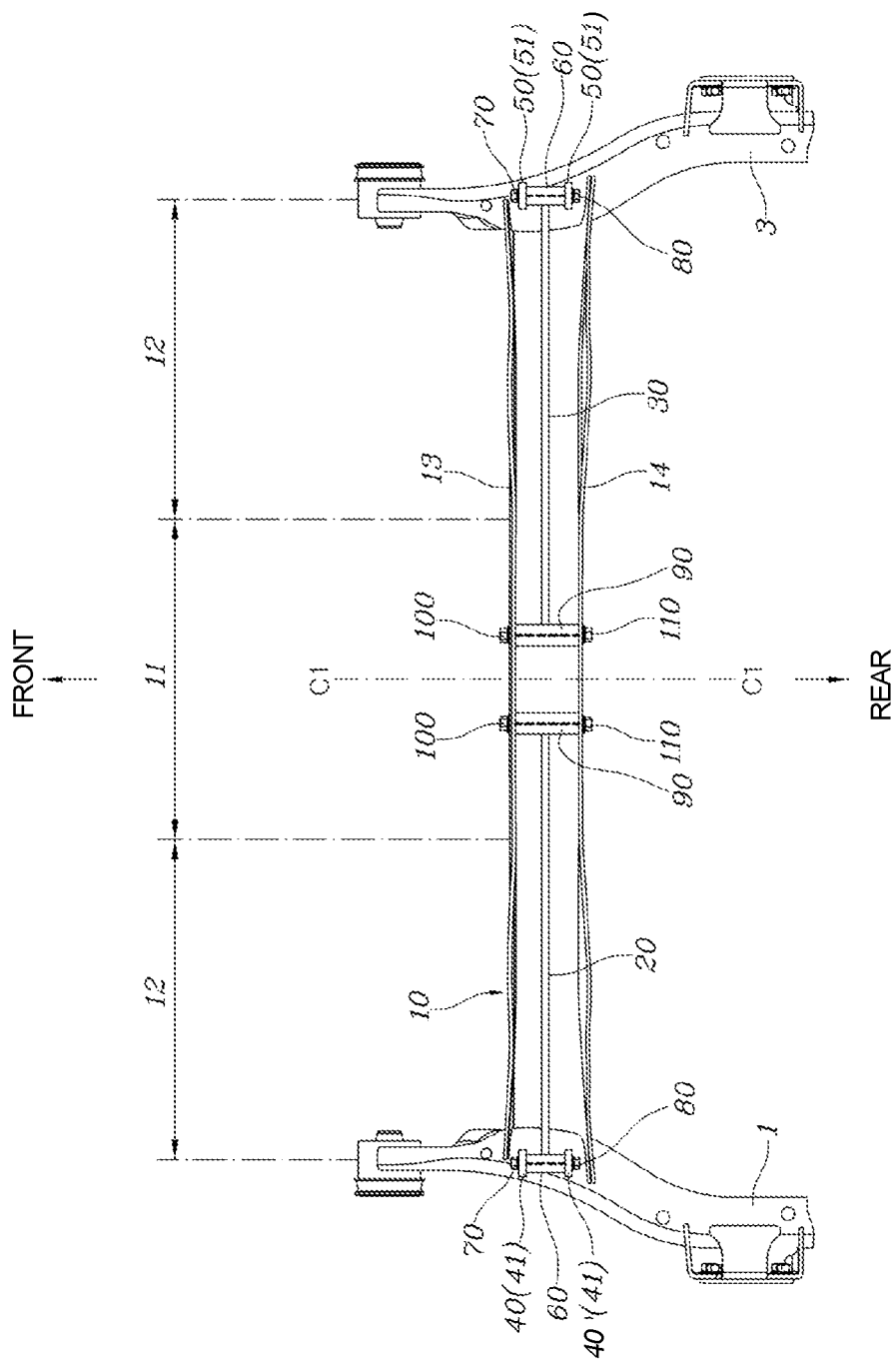
Figure 3:
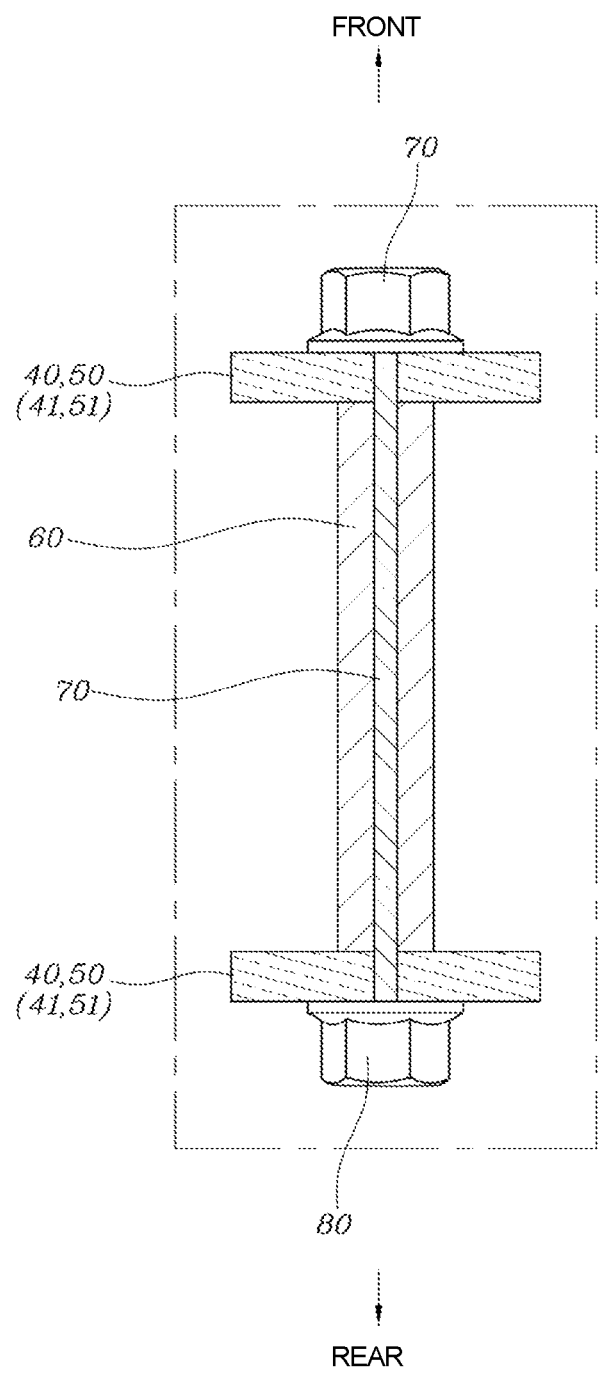
FIGS. 3 and 4 are cross-sectional views of a portion at which a first pipe and a second pipe are coupled to each other in FIG. 2.

FIGS. 1 to 3 show a structure in which the left side of the left torsion bar 20 is connected to the left trailing arm 1 and the right side of the right torsion bar 30 is connected to the right trailing arm 3 as an example.

That is, a first bracket 40 is fixedly coupled to a bottom surface of the left trailing arm 1 and a second bracket 50 is fixedly coupled to a bottom surface of the right trailing arm 3, the left side of the left torsion bar 20 is coupled to the first bracket 40 to be connected to the left trailing arm 1, and the right side of the right torsion bar 30 is coupled to the second bracket 50 to be connected to the right trailing arm 3.

In addition, when a length of the torsion beam 10 in the horizontal direction is trisected, the divided lengths are classified into an intermediate region 11 and two side regions 12 positioned on left and right sides of the intermediate region 11. Here, the right side of the left torsion bar 20 is coupled to be positioned at the intermediate region 11 and the left side of the right torsion bar 30 is coupled to be positioned at the intermediate region 11.

More specifically, the first bracket 40 and the second bracket 50 are each provided with two fixing portions 41 and 51 arranged to face each other while being separated in a front-rear direction, first pipes 60 each coupled to the left side of the left torsion bar 20 and the right side of the right torsion bar 30 are inserted between the two fixing portions 41 and 51, and first bolt 70 penetrate through the two fixing portions 41 and 51 and the first pipes 60 to be fastened to first nuts 80.

Therefore, the left side of the left torsion bar 20 and the right side of the right torsion bar 30 may be each separately coupled to the first bracket 40 and the second bracket 50 through fastening of the first bolt 70 and the first nut 80.

In addition, the first pipe 60 coupled to the left side of the left torsion bar 20 and the first pipe 60 coupled to the right side of the right torsion bar 30 may be each rotated around the first bolt 70. With this structure, the left side of the left torsion bar 20 and the right side of the right torsion bar 30 may be each rotated around the first bolt 70 in a vertical direction, in a state before the first bolt 70 and the first nut 80 are tightly fastened.

Figure 7:
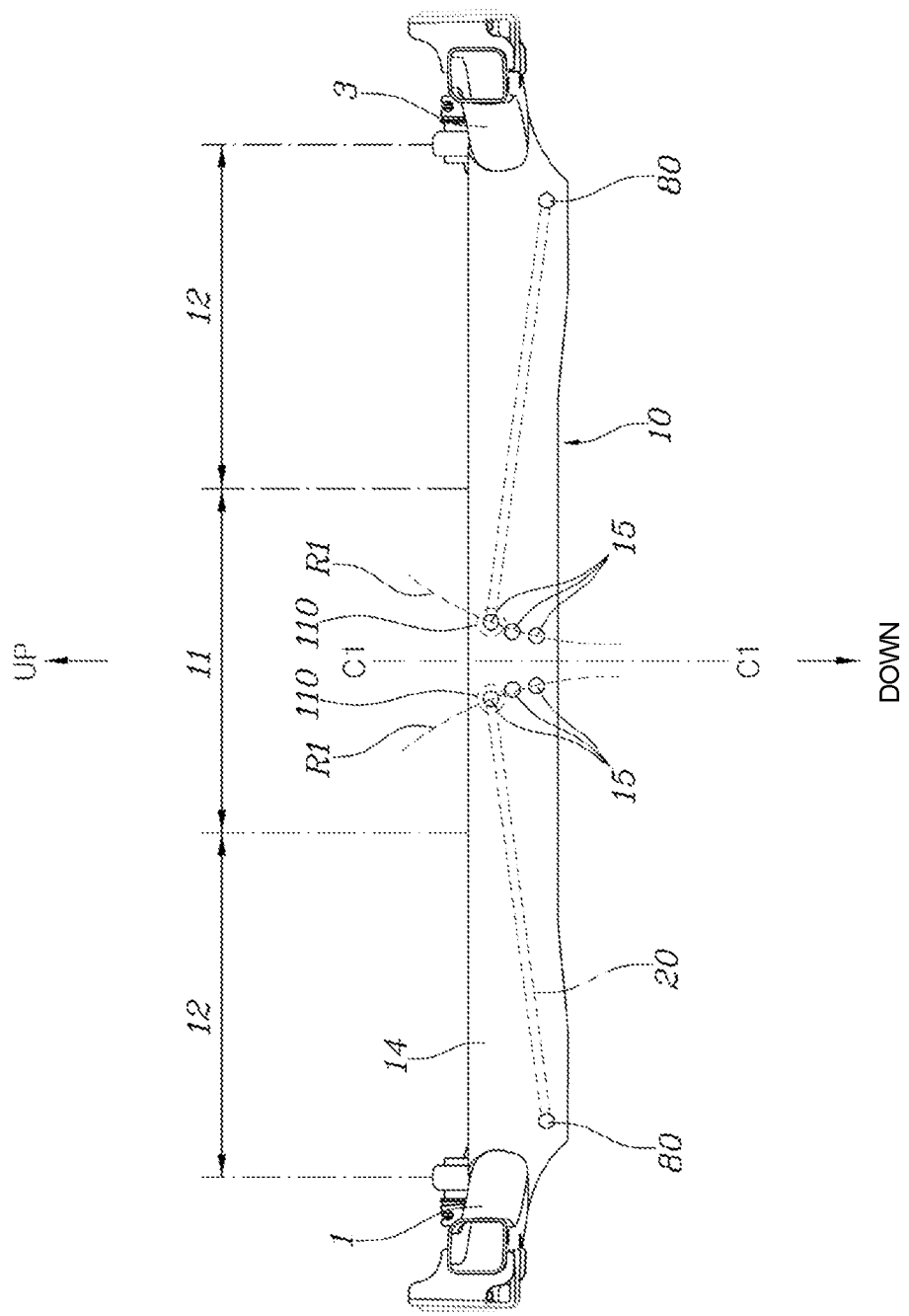

In addition, FIGS. 7 and 8 show another exemplary embodiment of a structure in which the left side of the left torsion bar 20 and the right side of the right torsion bar 30 are connected to the torsion beam 10.

That is, when a length of the torsion beam 10 in the horizontal direction is trisected, the right side of the left torsion bar 20 is coupled to be positioned at the intermediate region 11 and the left side of the right torsion bar 30 is coupled to be positioned at the intermediate region 11, and the left side of the left torsion bar 20 and the right side of the right torsion bar 30 are coupled to the two side regions 12 positioned at the left and right sides of the intermediate region 11.

The first pipes 60 are each coupled to the left side of the left torsion bar 20 and the right side of the right torsion bar 30 to be arranged in the front-rear direction, the first pipes 60 are arranged between front and rear surfaces 13 and 14 of the torsion beam 10, and the first bolt 70 penetrates through the front surface 13, the first pipe 60, and the rear surface 14 of the torsion beam 10, and then is fastened to the first nut 80.

The structure in which the left side of the left torsion bar 20 and the right side of the right torsion bar 30 are coupled to the side regions 12 of the torsion beam 10 exhibits the same performance as that of a structure in which the left side of the left torsion bar 20 is connected to the left trailing arm 1 and the right side of the right torsion bar 30 is connected to the right trailing arm 3.

In addition, according to the present disclosure, the right side of the left torsion bar 20 and the left side of the right torsion bar 30 are each separately coupled to the torsion beam 10.

That is, the second pipes 90 are each coupled to the right side of the left torsion bar 20 and the left side of the right torsion bar 30 to be arranged in the front-rear direction, the second pipes 90 are arranged between the front and rear surfaces 13 and 14 of the torsion beam 10, and a second bolt 100 penetrates through the front surface 13, the second pipe 90, and the rear surface 14 of the torsion beam 10, and then is fastened to a second nut 110.

Therefore, the right side of the left torsion bar 20 and the left side of the right torsion bar 30 are each separately coupled to the torsion beam 10 through fastening of the second bolt 100 and the second nut 110.

According to the present disclosure, the left torsion bar 20 and the right torsion bar 30 may be separable from each other, and thus, the torsion stiffness of the torsion beam 10 may be adjusted through a replacement of the left torsion bar 20 and the right torsion bar 30.

That is, the torsion stiffness of the torsion beam 10 may be tuned through a change in a thickness of a cross-section or a diameter of the torsion bar. Therefore, the left torsion bar 20 and the right torsion bar 30 having the thickness of the cross-section or the diameter of the torsion bar suitable for tuning may be replaced, thereby more easily adjusting the torsion stiffness of the torsion beam 10.

In addition, in the present disclosure, a hole 15 through which the second bolt 100 penetrates is formed to penetrate through the front and rear surfaces 13 and 14 of the torsion beam 10, and a plurality of holes 15 of the torsion beam 10 are spaced apart from each other in the vertical direction. The second bolt 100 penetrating through the second pipe 90 is fastened to the second nut 110 after penetrating through any one of the plurality of holes 15 spaced apart from each other in the vertical direction.

The plurality of holes 15 formed in the torsion beam 10 are spaced apart from each other at the same intervals along a locus R1 of a circle with the left side of the left torsion bar 20 and the right side of the right torsion bar 30 as a center. Accordingly, it is possible to easily adjust the stiffness only by changing a position where the right side of the left torsion bar 20 is coupled and a position where the left side of the right torsion bar 30 is coupled (changing a position in the vertical direction).

When a length of the torsion beam 10 in the horizontal direction is trisected, the right side of the left torsion bar 20 and the left side of the right torsion bar 30 each coupled to the intermediate region 11 through the second bolt 100.

In order to enhance an effect for adjusting the warping stiffness of the left torsion bar 20 and the right torsion bar 30, it is advantageous to make the right side of the left torsion bar 20 and the left side of the right torsion bar 30 to be closer to a center line C1 bisecting the length of the torsion beam 10 in the horizontal direction.

In addition, according to the present disclosure, the left torsion bar 20 and the right torsion bar 30 are coupled to be symmetrical with respect to the center line C1 bisecting the length of the torsion beam 10 in the horizontal direction, the left torsion bar 20 and the right torsion bar 30 including the holes 15 formed therein. Accordingly, it is possible to achieve the same characteristic of vehicle movement in a horizontal direction.

The left side of the left torsion bar 20 and the right side of the right torsion bar 30 may be each rotated around the first bolt 70 penetrating through the first pipe 60, and thus, the right side of the left torsion bar 20 and the left side of the right torsion bar 30 may be each rotated around the first bolt 70 in the vertical direction. Therefore, the second bolt 100 penetrating through the second pipe 90 may be fastened to the second nut 110 after penetrating through any one of the plurality of holes 15 spaced apart from each other in the vertical direction.

Here, as the second bolt 100 penetrating through the second pipe 90 is fastened toward the upper hole 15 among the plurality of the holes 15 spaced apart from each other in the vertical direction, warpage of the torsion beam 10 is relieved to lower the roll stiffness. Further, as the second bolt 100 penetrating through the second pipe 90 is fastened toward the lower hole 15 among the plurality of the holes 15 spaced apart from each other in the vertical direction, warpage of the torsion beam 10 is maximized to increase the roll stiffness.

Figure 4:
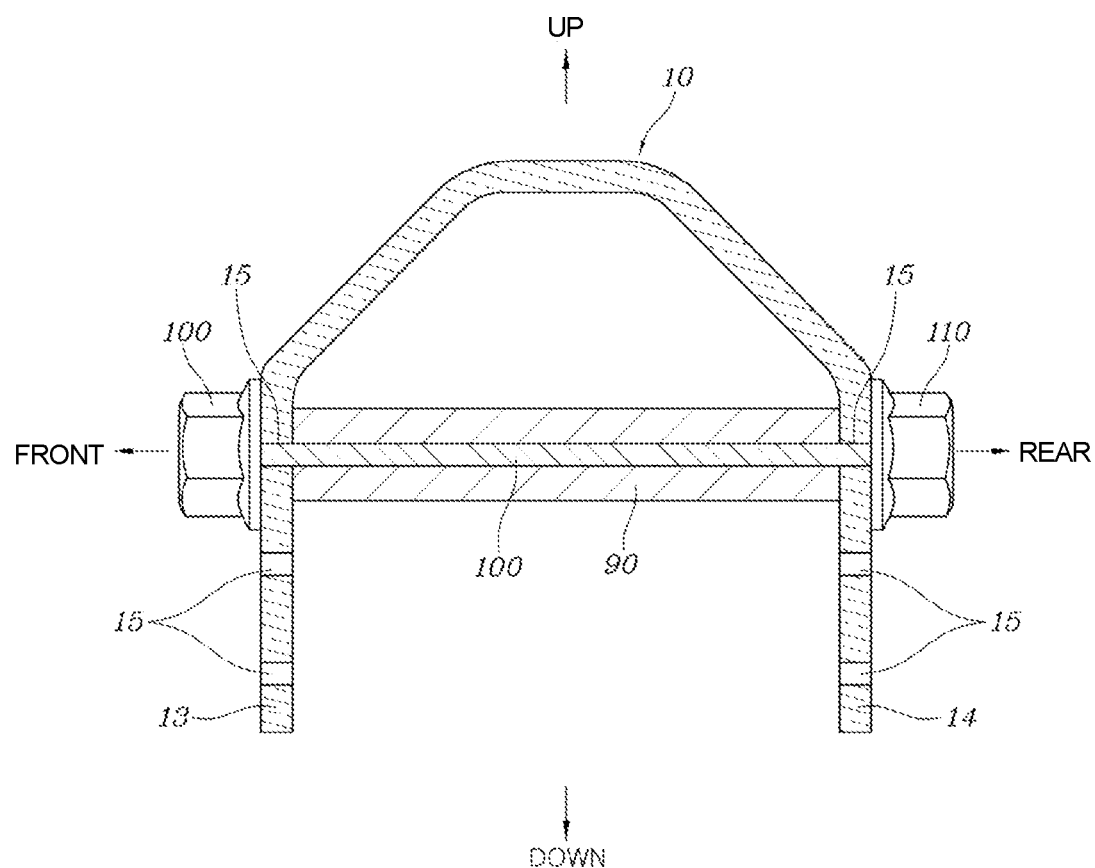
Figure 5:
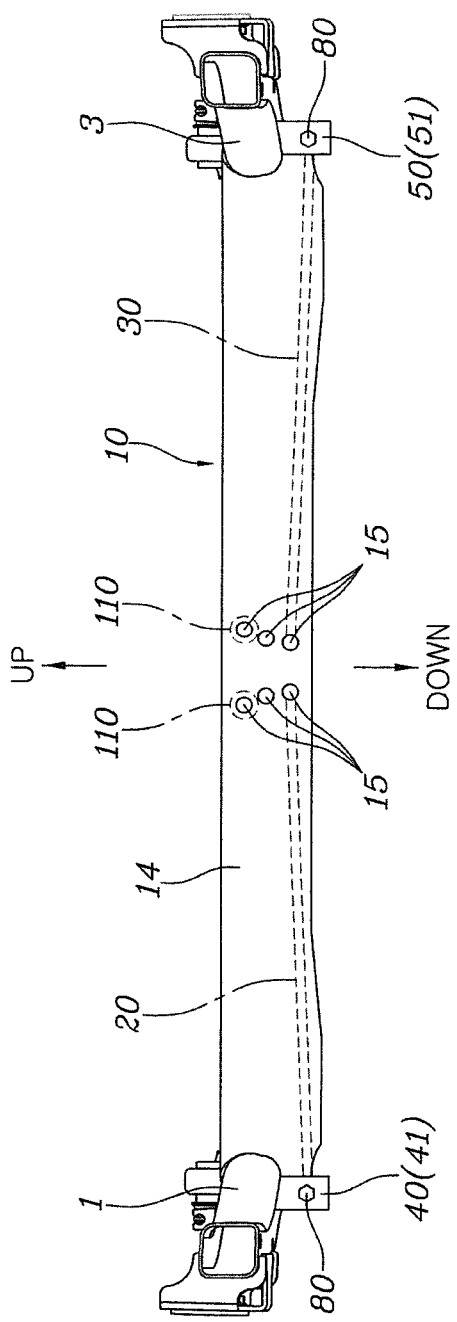
FIG. 5 is a view showing a state in which a second bolt penetrating through a second pipe is fastened in the lowermost hole.
Figure 6:
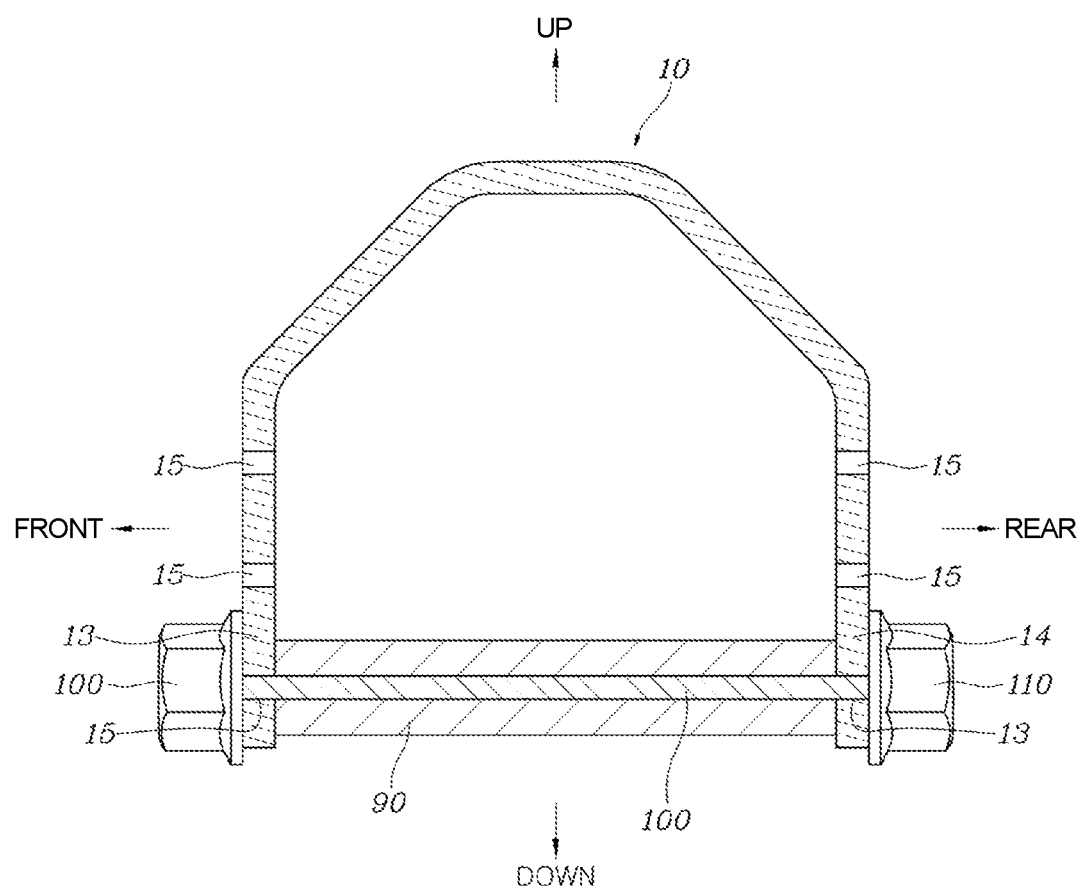
FIG. 6 is a cross-sectional view of a portion at which the second pipe is coupled in FIG. 5.

That is, according to the present disclosure, the warping stiffness of the torsion beam 10 may be tuned through the change in position where the second bolt 100 is fastened. As shown in FIGS. 1 and 4, the warping stiffness is reduced to the maximum when the second bolt 100 is fastened to the first nut 110 by penetrating through the topmost hole 15, and as shown in FIGS. 5 and 6, the warping stiffness is increased to the maximum when the second bolt 100 is fastened to the second nut 110 by penetrating through the hole 15 positioned at the lowermost portion.

According to the present disclosure, when the length of the torsion beam 10 in the horizontal direction is trisected, the right side of the left torsion bar 20 and the left side of the right torsion bar 30 are coupled to the intermediate region 11 through the second bolt 100, and accordingly, tuning of the warping stiffness of the torsion beam 10 may be more easily performed.

It is advantageous to enhance the effect for adjusting the warping stiffness as the right side of the left torsion bar 20 and the left side of the right torsion bar 30 are closer to the center line C1 bisecting the length of the torsion beam 10 in the horizontal direction.

If the second bolt 100 penetrating through the second pipe 90 is coupled not to be positioned at the intermediate region 11 of the torsion beam 10 but to be at the side region 12 thereof, a distance between the right side of the left torsion bar 20 and the left side of the right torsion bar 30 is widened. In this case, even if a fastened position of the second bolt 100 is changed in the vertical direction, the tuning of the warping stiffness of the torsion beam 10 may not be performed.

Therefore, in the present disclosure, the second bolt 100 is coupled to be positioned at the intermediate region 11 of the torsion beam 10, and accordingly, since a distance between the right side of the left torsion bar 20 and the left side of the right torsion bar 30 may be narrowed as much as possible, thereby easily performing the tuning of the warping stiffness of the torsion beam 10 through the change in the position where the second bolt 100 is fastened.

Figure 9A:
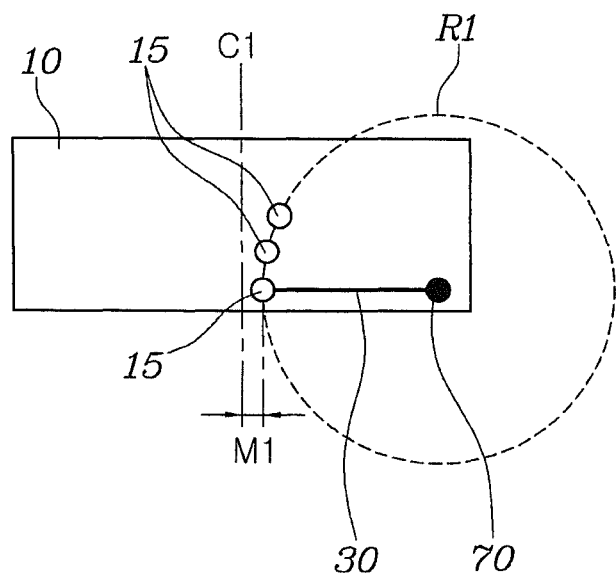
FIGS. 9A and 9B are views for explaining a position at which a left side of the right torsion bar is coupled to the torsion beam.

In addition, as shown in FIG. 9A, the lowermost hole 15, among the plurality of holes 15 formed vertically along the locus R1 of the circle in the intermediate region 11 of the torsion beam 10, may be formed at a position closest to the center line C1 bisecting the length of the torsion beam 10 in the horizontal direction. To this end, the left side of the left torsion bar 20 (first bolt 70) and the right side of the right torsion bar 30 (first bolt 70) each have the same height as that of the lowermost hole 15. Accordingly, the right side of the left torsion bar 20 and the left side of the right torsion bar 30 are each close to the center line C1 as much as possible (M1), and as a result, an effect for enhancing the warping stiffness may be improved to the maximum.

Figure 9B:
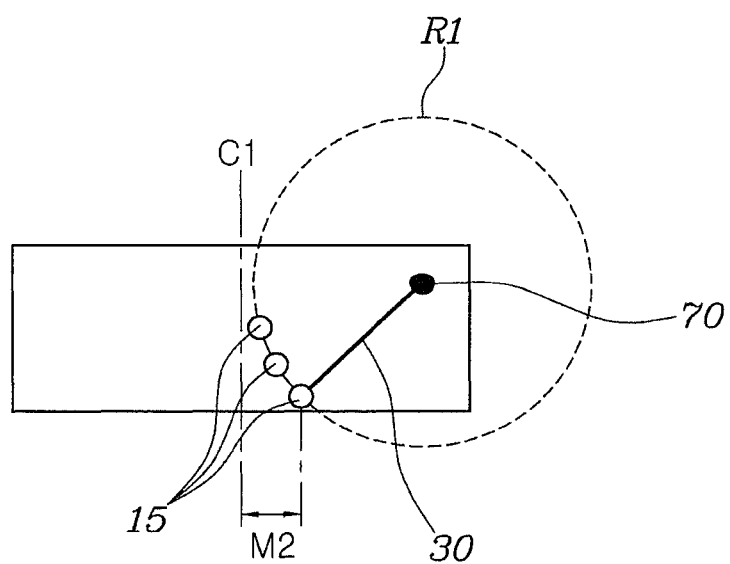

As shown in FIG. 9B, if the left side of the left torsion bar 20 (first bolt) and the right side of the right torsion bar 30 (first bolt 70) are each positioned higher than the lowermost hole 15, the hole 15 positioned at the lowermost portion is far away from the center line C1 (M2) and the distance between the right side of the left torsion bar 20 and the left side of the right torsion bar 30 is widened. In this case, even if the fastened position of the second bolt 100 is changed in the vertical direction, the tuning of the warping stiffness of the torsion beam 10 may not be performed.

Therefore, in order to smoothly perform the tuning of the warping stiffness of the torsion beam 10, the lowermost hole 15 among the plurality of holes 15 formed vertically along the locus R1 of the circle in the intermediate region 11 of the torsion beam 10, may be formed at a position closest to the center line C1 bisecting the length of the torsion beam 10 in the horizontal direction. To realize this, the left side of the left torsion bar 20 (first bolt) and the right side of the right torsion bar 30 (first bolt 70) each may have the same height as that of the lowermost hole 15.

As described above, a coupled torsion beam axle apparatus of a vehicle according to the present disclosure has a structure in which it is possible to perform tuning of the torsion stiffness of the torsion beam 10 through replacement of the left torsion bar 20 and the right torsion bar 30, and particularly, it is possible to perform tuning of the warping stiffness of the torsion beam 10 through the change in the position where the right side of the left torsion bar 20 is coupled to the torsion beam 10 and the position where the left side of the right torsion bar 30 is coupled to the torsion beam 10. Accordingly, since the roll stiffness may be tuned according to driving characteristics of a driver, the coupled torsion beam axle apparatus of a vehicle according to the present disclosure may be used in a general vehicle and racing vehicle or a high-performance vehicle.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A coupled torsion beam axle apparatus of a vehicle, comprising:
    a torsion beam arranged in a horizontal direction of the vehicle and coupled to a left trailing arm and a right trailing arm; and
    a left torsion bar and a right torsion bar arranged in an internal space of the torsion beam and separated from each other in a length direction of the torsion beam,
    wherein a left side of the left torsion bar is connected to any one of the left trailing arm and the torsion beam,
    wherein a right side of the right torsion bar is connected to any one of the right trailing arm and the torsion beam,
    wherein a right side of the left torsion bar and a left side of the right torsion bar are connected to the torsion beam, and
    wherein the left torsion bar and the right torsion bar are separable from each other, and torsion stiffness of the torsion beam is adjusted by replacing the left torsion bar and the right torsion bar.

2. The coupled torsion beam axle apparatus of claim 1, wherein a first bracket and a second bracket are fixedly coupled to the left trailing arm and the right trailing arm, respectively,
    wherein the left side of the left torsion bar is coupled to the first bracket to be connected to the left trailing arm,
    wherein the right side of the right torsion bar is coupled to the second bracket to be connected to the left trailing arm, and
    wherein, when a length of the torsion beam in the horizontal direction is trisected, the right side of the left torsion bar and the left side of the right torsion bar are each coupled to an intermediate region of the torsion beam.

3. The coupled torsion beam axle apparatus of claim 2, wherein the first bracket and the second bracket each includes two fixing portions arranged to face each other while being spaced apart in a front-rear direction,
    wherein a first pipe is inserted between the two fixing portions, the first pipe being coupled to each of the left side of the left torsion bar and the right side of the right torsion bar,
    wherein the two fixing portions and the first pipe are fastened to a first nut by penetrating through a first bolt, and
    wherein the left side of the left torsion bar and the right side of the right torsion bar are each rotated around the first bolt in a vertical direction, in a state before the first bolt and the first nut are fastened.

4. The coupled torsion beam axle apparatus of claim 1, wherein, when a length of the torsion beam in the horizontal direction is trisected, the right side of the left torsion bar and the left side of the right torsion bar are coupled to an intermediate region of the torsion beam, and
    wherein the left side of the left torsion bar and the right side of the right torsion bar are coupled to side regions positioned at left and right sides of the intermediate region.

5. The coupled torsion beam axle apparatus of claim 1, wherein second pipes are each coupled to the right side of the left torsion bar and the left side of the right torsion bar to be arranged in a front-rear direction,
    wherein the second pipe is arranged between front and rear surfaces of the torsion beam, and
    wherein the front and rear surfaces of the torsion beam and the second pipe are fastened to a second nut by penetrating through a second bolt.

6. The coupled torsion beam axle apparatus of claim 5, wherein the torsion beam includes a hole through which the second bolt penetrates, the hole penetrating through the front and rear surfaces of the torsion beam, and
    wherein a plurality of holes are spaced apart from each other in a vertical direction of the torsion beam.

7. The coupled torsion beam axle apparatus of claim 6, wherein the plurality of holes are spaced apart from each other along a locus of a circle with the left side of the left torsion bar and the right side of the right torsion bar as a center.

8. The coupled torsion beam axle apparatus of claim 7, wherein a lowermost hole among the plurality of holes, which are vertically spaced apart from each other along the locus of the circle, is arranged at a position closest to a center line bisecting a horizontal length of the torsion beam, and
    wherein a first bolt located at the left side of the left torsion bar and a first bolt located at the right side of the right torsion bar are each located to have the same height as that of the lowermost hole.

9. The coupled torsion beam axle apparatus of claim 6, wherein as the second bolt is fastened toward an upper hole, warpage of the torsion beam is relieved to lower the roll stiffness, and as the second bolt is fastened toward a lower hole, the warpage of the torsion beam is maximized to increase the roll stiffness.

10. The coupled torsion beam axle apparatus of claim 5, wherein when a length of the torsion beam in the horizontal direction is trisected, the right side of the left torsion bar and the left side of the right torsion bar are coupled to an intermediate region of the torsion beam through the second bolt.

11. The coupled torsion beam axle apparatus of claim 1, wherein the left torsion bar and the right torsion bar are coupled to be symmetrical with respect to a center line bisecting a length of the torsion beam in the horizontal direction.

\* \* \* \* \*